US012617301B2

(12) United States Patent　　　　　(10) Patent No.: US 12,617,301 B2
Sharida et al.　　　　　　　　　　　　(45) Date of Patent: May 5, 2026

(54) BIDIRECTIONAL MULTI-PORT DC-DC CONVERTER FOR MOBILE CHARGING APPLICATIONS

(71) Applicant: Qatar Foundation for Education, Science and Community Development, Doha (QA)

(72) Inventors: Ali Sharida, Doha (QA); Sertac Bayhan, Doha (QA); Haitham Abu-Rub, Doha (QA)

(73) Assignee: Qatar Foundation for Education, SCience and Community Development, Doha (QA)

( * ) Notice: Subject to any disclaimer, the term of this patent is extended or adjusted under 35 U.S.C. 154(b) by 62 days.

(21) Appl. No.: 18/940,250

(22) Filed: Nov. 7, 2024

(65) Prior Publication Data

US 2025/0145029 A1　　May 8, 2025

Related U.S. Application Data

(60) Provisional application No. 63/547,740, filed on Nov. 8, 2023.

(51) Int. Cl.
　*H02J 7/00*　　　(2026.01)
　*B60L 3/00*　　　(2019.01)
　　　　　(Continued)

(52) U.S. Cl.
　CPC ............... *B60L 53/11* (2019.02); *B60L 53/53* (2019.02); *B60L 53/62* (2019.02); *B60L 53/63* (2019.02);
　　　　　(Continued)

(58) Field of Classification Search
　CPC .......... B60L 53/11; B60L 53/53; B60L 53/62; B60L 53/63; B60L 55/00; B60L 2210/10;
　　　　　(Continued)

(56) References Cited

U.S. PATENT DOCUMENTS

2018/0134279 A1*　5/2018　Barkdull ................. B60L 58/13
2018/0354372 A1*　12/2018　Yang ................. H02M 7/53873
　　　　　(Continued)

OTHER PUBLICATIONS

Lai, et al.; "Development of a Bidirectional DC/DC Converter With Dual-Battery Energy Storage for Hybrid Electric Vehicle System"; IEEE Transactions on Vehicular Technology; vol. 67, No. 2; Feb. 2018; (17 pages).

(Continued)

*Primary Examiner* — Elim Ortiz
(74) *Attorney, Agent, or Firm* — K&L Gates LLP

(57) ABSTRACT

This disclosure is directed to mobile electric vehicle charging systems including a storage battery and a controller, coupled to the storage battery. Additionally, the system may include a DC-DC converter module coupled to the controller, having a high voltage interface, an electric vehicle interface, and a storage battery interface. The high voltage interface electrically couples the converter module to a high voltage power source via an AC-DC converter, the storage battery interface electrically couples the converter module to the storage battery, and the electric vehicle interface electrically couples the converter module to an electric vehicle battery. The DC-DC converter is configured to transmit power to and from the high voltage source, the storage battery, an electric vehicle battery in response, at least in part, to a signal from the controller.

20 Claims, 4 Drawing Sheets

(51) Int. Cl.

| | |
|---|---|
| *B60L 50/60* | (2019.01) |
| *B60L 53/10* | (2019.01) |
| *B60L 53/53* | (2019.01) |
| *B60L 53/62* | (2019.01) |
| *B60L 53/63* | (2019.01) |
| *B60L 55/00* | (2019.01) |
| *B60L 58/12* | (2019.01) |
| *B60W 10/08* | (2006.01) |
| *B60W 20/00* | (2016.01) |
| *H01M 10/44* | (2006.01) |
| *H01M 10/48* | (2006.01) |
| *H02J 3/32* | (2006.01) |
| *H02J 3/36* | (2006.01) |
| *H02J 7/02* | (2016.01) |
| *H02J 7/34* | (2006.01) |

(52) U.S. Cl.
CPC ............. *B60L 55/00* (2019.02); *H02J 3/322* (2020.01); *H02J 3/36* (2013.01); *H02J 7/342* (2020.01); *B60L 2210/10* (2013.01); *B60L 2210/30* (2013.01); *H02J 2207/20* (2020.01)

(58) Field of Classification Search
CPC ......... B60L 2210/30; H02J 3/322; H02J 3/36; H02J 7/342; H02J 2207/20; H02J 2105/37; Y02T 10/70; Y02T 10/7072

USPC ....... 320/109, 107, 134, 108, 104, 103, 116, 320/128, 132, 162; 701/22; 307/9.1, 307/10.1
See application file for complete search history.

(56) References Cited

U.S. PATENT DOCUMENTS

2020/0369168 A1\* 11/2020 Barker ................... B60L 53/16
2020/0381923 A1\* 12/2020 Chow .............. H01M 10/4207

OTHER PUBLICATIONS

Rao, et al.; "Design of a bidirectional DC/DC converter for a hybrid electric drive system with dual-battery storing energy"; Frontiers in Energy Research; Nov. 2022; (19 pages).

Wu, et al.; "Novel Bidirectional Isolated DC/DC Converter with High Gain Ratio and Wide Input Voltage for Electric Vehicle Storage Systems"; MDPI; Nov. 2022; (28 pages).

Eroglu, et al.; "Bidirectional DC-DC converter based multilevel battery storage systems for electric vehicle and large-scale grid applications: A critical review considering different topologies, state-of-charge balancing and future trends"; Wiley; 2020; (24 pages).

\* cited by examiner

BIDIRECTIONAL MULTI-PORT DC-DC CONVERTER FOR MOBILE CHARGING APPLICATIONS

PRIORITY CLAIM

This application claims the benefit of and priority to U.S. Provisional Patent App. 63/547,740, filed Nov. 8, 2023, the entire disclosure of which is incorporated by reference herein.

BACKGROUND

Charging stations are generally used to supply electricity from the power grid to the battery of an electric vehicle (EV). Most of the available charging stations are capable of "fast DC charging" by utilizing conventional AC-DC and DC-DC converters to support the conversion of the AC power from grid to DC power at a voltage level receivable by the EV. However, these traditional charging topologies give rise to a plethora of operational issues. For example, as charging stations are generally implemented at a fixed location, charging stations may stress a given area of the power grid in situations where many EVs are pulling power from the grid at the same time, which may result in reliability issues. Additionally, commercial fast DC charging EV stations are generally unidirectional consisting of a controlled rectifier, which includes a number of power switches, which may be vulnerable to faults, which may also result in operational issues.

Accordingly, a need exists for a system for EV charging with improved operational reliability.

SUMMARY

The present disclosure provides a new and innovative system for DC fast charging, including mobile DC fast charging, an EV battery while providing improved electrical reliability. The present disclosure provides a variety of benefits in different applications using the same DC-DC converter module. For example, the present disclosure provides systems, methods, and apparatus which are capable of use to support power grids during peak operation times by drawing unused power from EV batteries and storage batteries integrated into the DC-DC converter module. The system implements logic to determine when it is appropriate for the DC-DC converter module to charge the EV battery or the storage battery, or send power from the EV battery or the storage battery back to the grid to be repurposed. This is capable of vastly increasing generation and demand management of electrical grids, including peak shaving, load shifting, valley filling, and more. The power quality and peak power ratings of electrical grids can be optimized as a result. It is also capable of reducing the cost of charging system designs by reducing the number of required converters. Setup cost, operational cost, and energy cost of charging systems can thereby be substantially reduced. The DC-DC converter module also provides high reliability against faults by providing a redundant current path. This provides the advantage of enhanced fault-tolerant control on component-level and leg-level, and can be extended for module-level and system-level fault-tolerant control. Moreover, each current path will handle half of the power demanded by the load, increasing reliability and expected lifetime of the components and the system as a whole.

In a first aspect according to the present disclosure, a system is provided including a storage battery and a controller, coupled to the storage battery. Additionally, the system may include a DC-DC converter module coupled to the controller, having a high voltage interface, an electric vehicle interface, and a storage battery interface. The high voltage interface electrically couples the converter module to a high voltage power source, the storage battery interface electrically couples the converter module to the storage battery, and the electric vehicle interface electrically couples the converter module to an electric vehicle battery. The DC-DC converter is configured to transmit power to and from the high voltage source, the storage battery, an electric vehicle battery in response, at least in part, to a signal from the controller.

In a second aspect according to the present disclosure, the system includes a first operating mode, wherein the DC-DC converter module is electrically disconnected from the electric vehicle battery and the DC-DC converter module transmits power from the high voltage power source to the storage battery. The controller is configured to cause the first operating mode to be activated when the electric vehicle battery is disconnected from the electric vehicle interface, a state of charge of the storage battery is less than a predetermined threshold state of charge, and the high voltage power source has a sufficient energy supply to charge the storage battery.

In a third aspect according to the present disclosure, the system includes a second operating mode, wherein the DC-DC converter module is electrically disconnected from the electric vehicle battery and the DC-DC converter module transmits power from the storage battery to the high voltage power source. the high voltage power source comprises an electrical grid, and the electrical grid repurposes the power from the storage battery. The controller is configured to cause the second operating mode to be activated when the electric vehicle battery is disconnected from the electric vehicle interface, a state of charge of the storage battery is above a predetermined threshold state of charge, and an energy demand on the high voltage power source exceeds an energy supply of the high voltage power source.

In a fourth aspect according to the present disclosure, the system includes a third operating mode, wherein the DC-DC converter module is electrically disconnected from the storage battery based at least in part on a signal from the controller and the DC-DC converter module transmits power from the high voltage power source to the electric vehicle battery. The controller is configured to cause the third operating mode to be activated when a state of charge the electric vehicle battery is below a predetermined level of charge and the high voltage power source has a sufficient supply to charge the electric vehicle battery.

In a fifth aspect according to the present disclosure, the system includes a fourth operating mode, wherein the DC-DC converter module is electrically disconnected from the storage battery based at least in part on a signal from the controller and the DC-DC converter module transmits power from the electric vehicle battery to the high voltage power source. The high voltage power source comprises an electrical grid, and the electrical grid repurposes the power from the electric vehicle battery. The controller is configured to cause the fourth operating mode to be activated when a state of charge of the electric vehicle battery is above a predetermined level of charge and an energy demand on the high voltage power source exceeds an energy supply of the high voltage power source.

In a sixth aspect according to the present disclosure, the system includes a fifth operating mode, wherein the DC-DC converter module is electrically disconnected from the high voltage power source and the DC-DC converter module transmits power from the storage battery to the electric vehicle battery. The controller is configured to cause the fifth operating mode to be activated when a state of charge of the electric vehicle battery is below a predetermined level of charge and an energy supply through the high voltage interface is insufficient to charge the electric vehicle battery. The DC-DC converter module is electrically disconnected from the high voltage power supply based at least in part on a signal from the controller or by physical disconnection of the high voltage power supply.

In a seventh aspect according to the present disclosure, the controller performs periodic checks on the state of the electric vehicle battery, the storage battery, and the high voltage power source. The controller causes one of a plurality of operating modes to be activated based at least in part on a state of the electric vehicle battery, the storage battery, and the high voltage power source.

In an eight aspect according to the present disclosure, a method of managing power transmission in an electric vehicle charger is provided, the method including providing a DC-DC converter module coupled to a controller, the DC-DC converter including a high voltage interface, an electric vehicle interface, and a storage battery interface, measuring a state of charge of an electric vehicle battery electrically coupled to the electric vehicle interface, measuring a state of charge of a storage battery electrically coupled to the storage battery interface, measuring a power level of a high voltage DC bus electrically coupled to the high voltage interface, and determining whether the electric vehicle battery is electrically coupled to the electric vehicle interface.

In a ninth aspect according to the present disclosure, when it is determined that the electric vehicle battery is electrically coupled to the electric vehicle interface, the method further comprises: while the power level of the high voltage DC bus is determined to be sufficient to charge the electric vehicle battery, charging the electric vehicle battery by power from the high voltage DC bus, and while the power level of the high voltage DC bus is determined to be insufficient to charge the electric vehicle battery, if the state of charge of the storage battery is above a first predetermined threshold state of charge, charging the electric vehicle battery by power from the storage battery.

In a tenth aspect according to the present disclosure, when it is determined that the electric vehicle battery is not electrically coupled to the electric vehicle interface, the method further comprises: while the power level of the high voltage DC bus is determined to be sufficient to charge the storage battery, charging the storage battery by power from the high voltage DC bus, and while the power level of the high voltage DC bus is determined to be insufficient to charge the storage battery, if the state of charge of the storage battery is determined to be above a second predetermined threshold state of charge, transmitting power from the storage battery to the high voltage DC bus.

According to the present disclosure, the proposed DC-DC converter supports both portable and stationary fast EV charging stations by integrating an additional internal battery storage system with the charging station. In this manner, two batteries (the EV battery and the storage battery) are integrated. This provides numerous benefits over known methods of charging, charging services, and utility grid use.

Additional features and advantages of the disclosed method and apparatus are described in, and will be apparent from, the following Detailed Description and the Figures. The features and advantages described herein are not allinclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

The present disclosure provides new and innovative multi-port, multi-objective DC-DC converter system for use in DC fast charging of electric vehicles, capable of operating with a high voltage power source or as a portable charging system without access to the power source.

Figure 1:
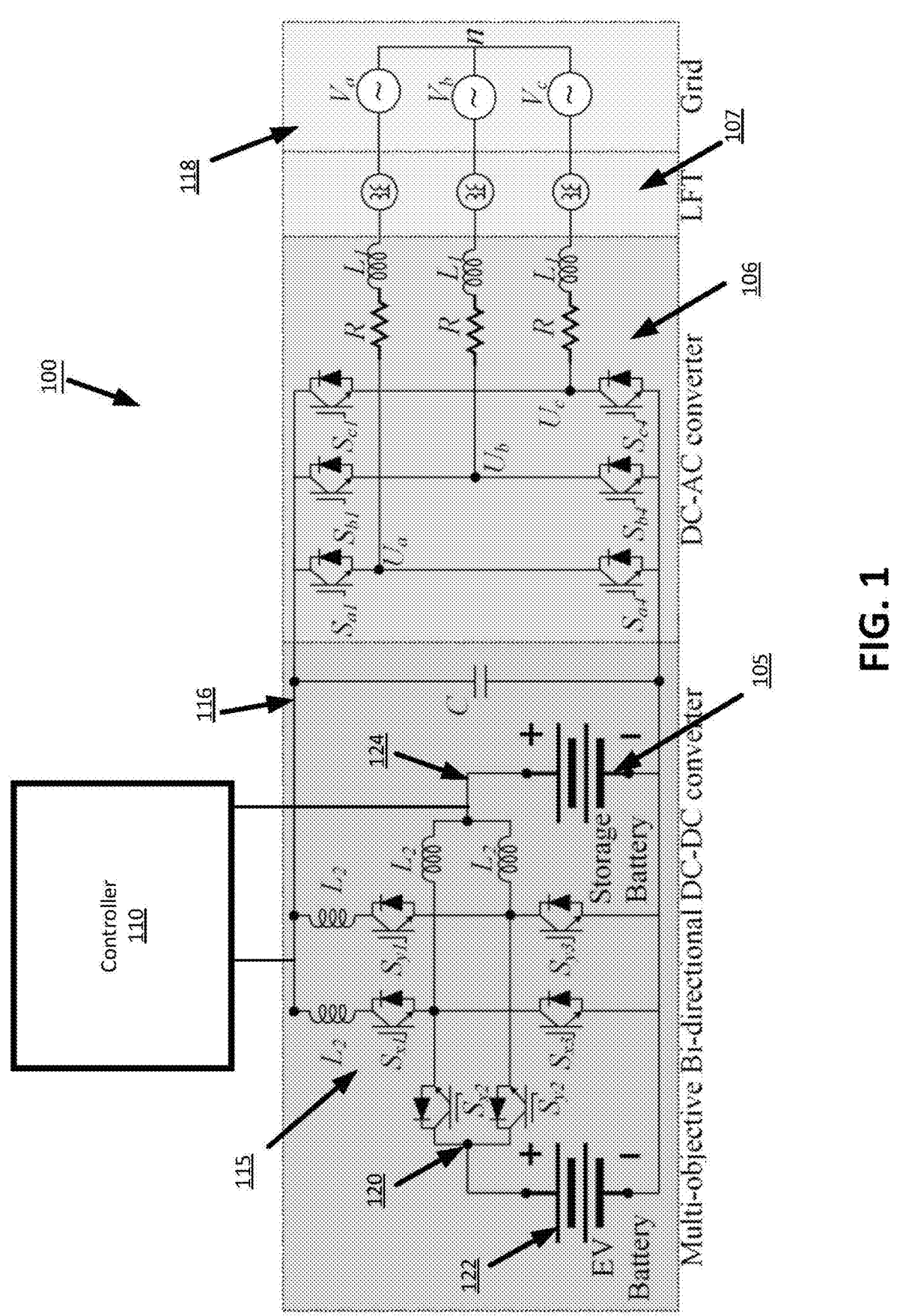
FIG. 1 illustrates an example embodiment of a system according to the present disclosure.

FIG. 1 depicts a charging station schematic with a system of the present disclosure implemented. The system may include a storage battery 105. The storage battery 105 may be a high voltage DC battery or any DC battery configured to supply power to an electric vehicle. The storage battery 105 may be operationally coupled to a controller 110 and a DC-DC converter module 115. Although the controller 110 is depicted with two connections in the figures, any number of couplings in any number of locations necessary to carry out the system's capabilities is contemplated, as will be appreciated by those skilled in the art. The DC-DC converter module 115 may include a storage battery interface 124 which electrically connects the DC-DC converter module 115 to the storage battery 105. The storage battery 105 may be configured to supply power to the DC-DC converter. The DC-DC converter module 115 may also include a high voltage interface 116 which electrically connects the DC-DC converter module 115 to a high voltage power source 118. For example, the high voltage interface 116 may connect the DC-DC converter module 115 to the bulk electric grid 118 via a low frequency isolating transformer 107 and a DC-AC converter 106 (which may optionally be referred to as an AC-DC converter). The grid 118 may supply high voltage AC power which is transformed and converted to DC power that is supplied to the DC-DC converter module 115.

The controller 110 may be configured to connect and disconnect the DC-DC converter module 115 from the storage battery 105 via the storage battery interface 124. The controller 110 may also be configured to connect and disconnect the DC-DC converter module 115 from the electric vehicle battery 122 via the electric vehicle interface 120. The controller 110 may also be configured to connect and disconnect the DC-DC converter module 115 from the high voltage power source, e.g. grid 118, via the high voltage interface 116. Through these minimized and optimized switching mechanisms, the DC-DC converter allows the system to operate in a number of operating modes. For example, the system may provide grid reliability support by supplying power via the electric vehicle battery 122 or the storage battery 105 to the grid 118. Also, the system may charge the electric vehicle battery via the DC-DC converter module 115 supplied by the grid 118, or for portable charging situations, the storage battery 105.

The proposed DC-DC converter 115 and system 100 generally may be applied to industrial stationary and portable and fast electric vehicle chargers while adhering to grid standards and constrains, industrial reliability requirements, and commercial cost requirements. Those skilled in the art will recognize that aspects of the current disclosure may be implemented on a wide range of electric vehicle and other charging technologies, and that the structure and logic illustrated are not meant to limit the scope of the disclosure.

FIGS. 2*a-e* illustrate a system of the present disclosure in different switching positions which represent different modes for use in a variety of novel applications.

Figures 2A, 2B, 2C, 2D, 2E:
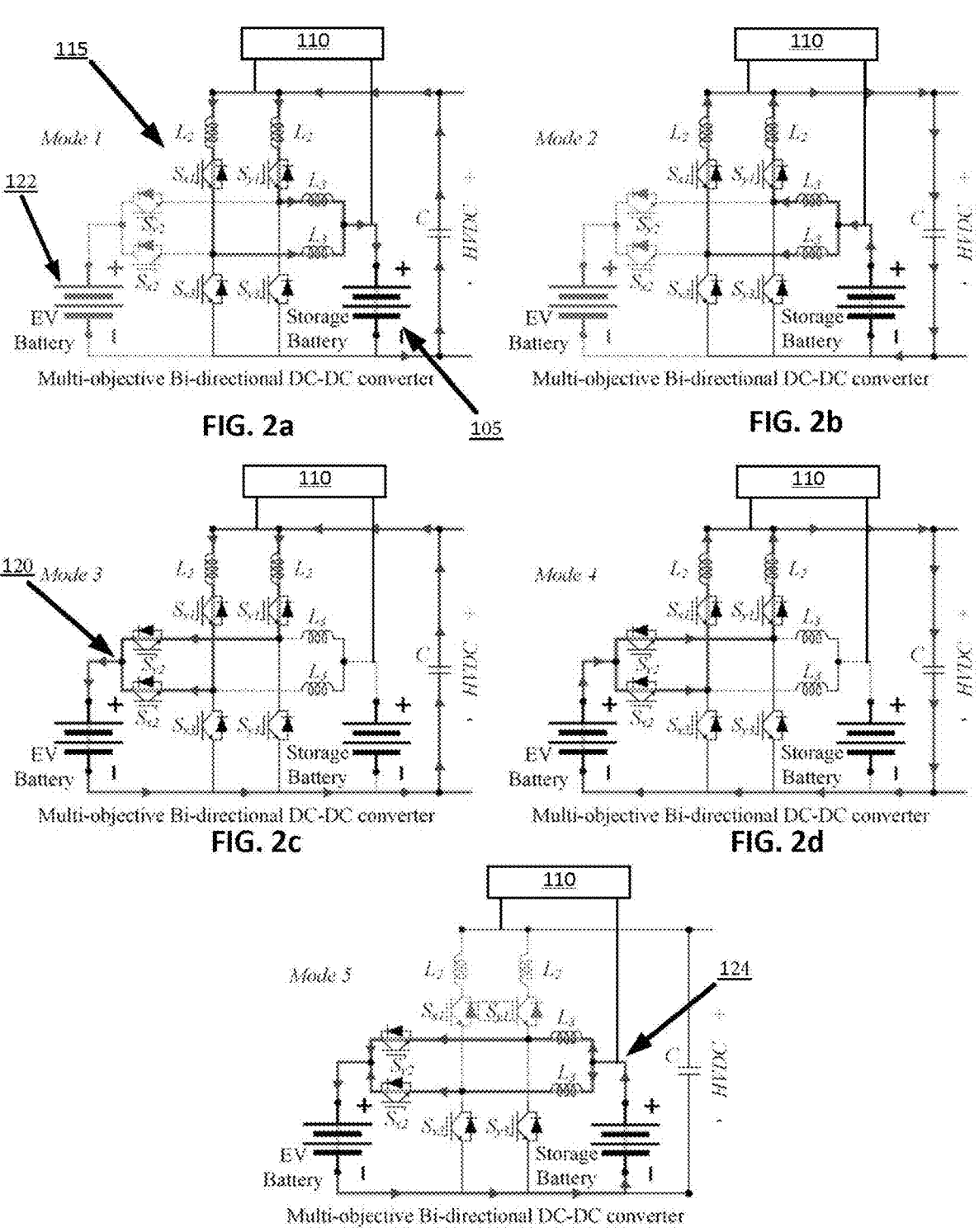
FIGS. 2a-e illustrate another example embodiments of operating modes of the system according to the present disclosure.

FIGS. 2*a* and 2*b* show a system of the present disclosure including a DC-DC converter module 115 in which the DC-DC converter 115 is disconnected from the electric vehicle battery 122, based in part on a signal from the controller 110. In this arrangement, the DC-DC converter 115 may transmit power from a high voltage power source 118 (not shown) to the storage battery 105 in order to recharge the storage battery 105, as depicted in FIG. 2*a*. This arrangement and transmission direction may be referred to as a first mode.

Alternatively, the DC-DC converter 115 may transmit power from the storage battery 105 to the high voltage power source 118, such as the electric grid, as depicted in FIG. 2*b*. This arrangement and transmission direction may be referred to as a second mode. In this arrangement the system 100 may also provide the grid 118 with reliability support using the storage battery 105 via the DC-DC converter module 115. For example, the system may provide reactive power support by supplying power from the storage battery 105 to the grid 118. Grid operators may utilize the power supplied for peak shaving and load shifting and improve system reliability. In this embodiment, the system's benefits over traditional, unilateral DC fast charging systems are clear, as the present system minimizes the reliability issues experienced due to DC fast charging systems while also providing grid reliability support capabilities.

FIGS. 2*c* and 2*d* show a system of the present disclosure including a DC-DC converter module 115 in which the DC-DC converter 115 is disconnected from the storage battery 105, based in part on a signal from the controller 110. In this arrangement, the DC-DC converter 115 may transmit power from a high voltage power source 118 to the electric vehicle battery 122 in order to charge the electric vehicle battery 122 via the electric vehicle interface 120, as depicted in FIG. 2*c*. This arrangement and transmission direction may be referred to as a third mode. As the DC-DC converter 115 may be capable of delivering DC power directly to the DC battery of an electric vehicle 122, the system may be capable of DC fast charging of an electric vehicle battery 122.

Alternatively, the DC-DC converter 115 may transmit power from the electric vehicle battery 122 to the high voltage power source 118, such as the electric grid, as depicted in FIG. 2*d*. This arrangement and transmission direction may be referred to as a fourth mode. In this arrangement the system 100 may also provide the grid 118 with reliability support using the electric vehicle battery 122 via the DC-DC converter module 115. For example, the system may provide reactive power support by supplying power from the electric vehicle battery 122 to the grid 118. Grid operators may utilize the power supplied for peak shaving and load shifting and improve system reliability.

FIG. 2*e* shows a system of the present disclosure including a DC-DC converter module 115 in which the DC-DC converter 115 is disconnected from the high voltage power source 118, based in part on a signal from the controller 110. In this arrangement, the DC-DC converter 115 may transmit power from the storage battery 105 to the electric vehicle battery 122 in order to charge the electric vehicle battery 122 via the storage battery interface 124 electric vehicle interface 120, as depicted in FIG. 2*e*. This arrangement and transmission direction may be referred to as a fifth mode. As the DC-DC converter 115 may be capable of delivering DC power directly to the DC battery of an electric vehicle 122, the system may be capable of DC fast charging of an electric vehicle battery 122. Thus, the system may also provide portable charging station capabilities, providing flexibility in charging location, while still allowing for EV battery charging and providing no impact on grid reliability.

Figure 3:
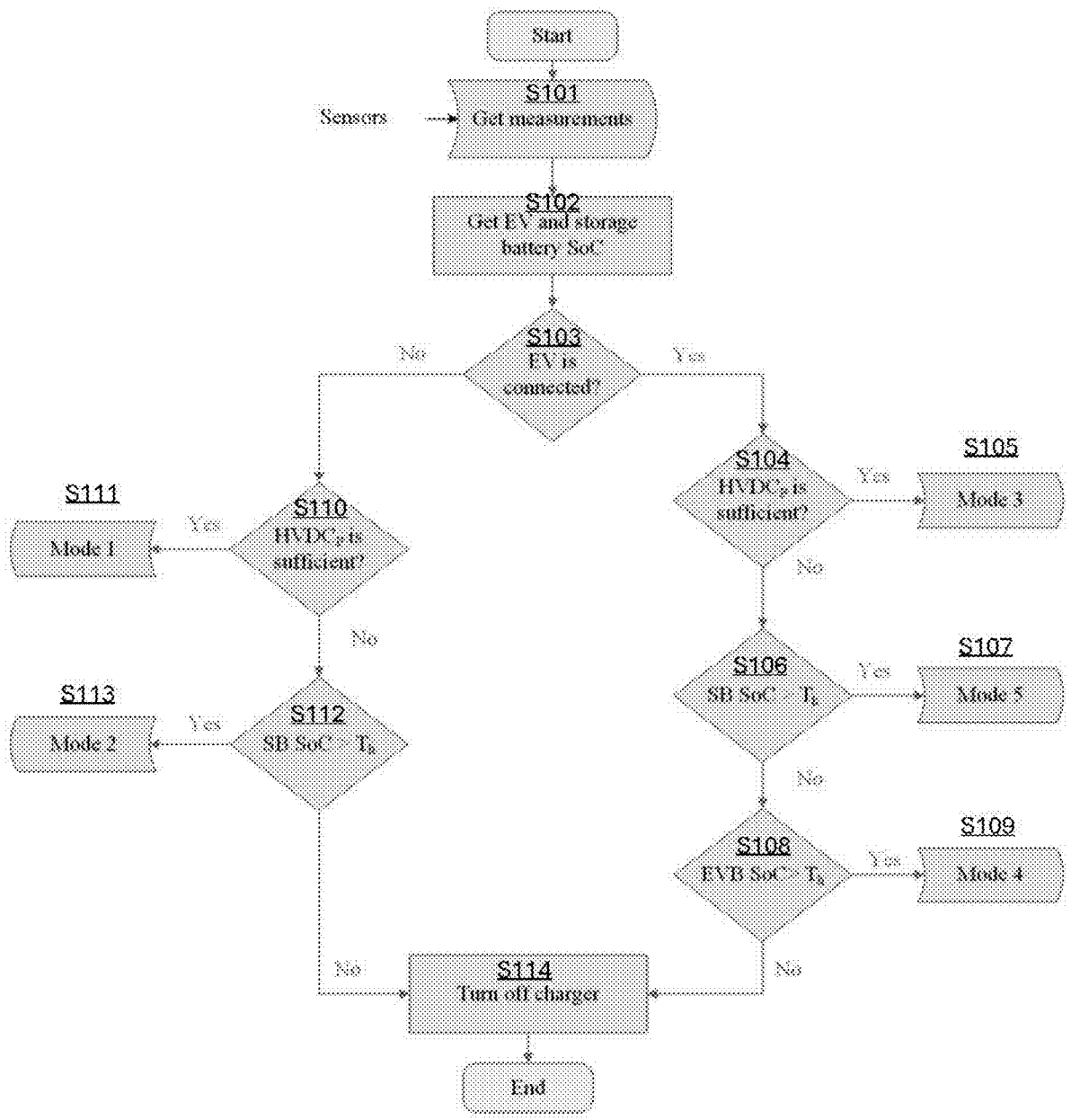
FIG. 3 illustrates a possible logic flow of the system according to the present disclosure.

Turning to FIG. 3, a flow diagram is depicted which illustrates the most general level of logic for the controller to determine in which mode the system 100 will operate. At a first step S101, measurements are gathered by the controller 110 using sensors disposed at various points along the DC-DC converter 115. Such sensors are configured to measure a state of charge ("SoC") of the electric vehicle battery 122, a SoC of the storage battery 105, and a power level of the high voltage DC bus ("HVDC$_p$"). The sensors may also be configured to determine whether the electric vehicle battery 122 is physically connected to the DC-DC converter 115 at all.

Once the sensors acquire the necessary measurements, the controller 110 at step S102 uses the measurements to determine the current SoCs of the electric vehicle battery 122 and the storage battery 105. At step S103 the controller 110 determines if an electric vehicle battery 122 is connected to the system 100. If an electric vehicle battery 122 is connected, the system 100 proceeds to step S104, where the controller determines whether the HVDC$_p$ is sufficient to provide a charge to the electric vehicle battery 122. If the HVDC$_p$ is sufficient, the system 100 proceeds to step S105 where the controller 110 causes the system 100 to operate at the third mode. If the HVDC$_p$ is insufficient to provide a charge to the electric vehicle battery 122, the system 100 proceeds to step S106 where the controller 110 determines if the current SoC of the storage battery 105 is greater than a predetermined threshold SoC (T$_h$). The T$_h$ may be any desired threshold level and may be adjustable and configurable. An example T$_h$ would be 95% of a full charge level for the storage battery 105. The T$_h$ may also be higher or lower, for example 80% of a full charge level for the storage battery 105. If the SoC of the storage battery 105 is above the T$_h$, the system 100 proceeds to step S107, where the controller 110 causes the system 100 to operate at the fifth mode. If the SoC of the storage battery 105 is below the T$_h$, then the system 100 proceeds to step S108, where the controller 110 determines whether a SoC of the electric vehicle battery 122 is greater than a predetermined threshold SoC, which may be the same threshold or a different threshold than T$_h$. For purposes of illustration, T$_h$ will be used to describe a common threshold between the SoC of the electric vehicle battery 122 and the storage battery 105. If the SoC of the electric vehicle battery 122 is above the T$_h$, then the system 100 proceeds to step S109, where the controller 110 causes the system 100 to operate at the fourth mode. If the SoC of the electric vehicle battery 122 is below the T$_h$, then the system 100 proceeds to step S114 where the DC-DC converter 115 is turned off (or idle) and no power is flowing to or from the storage battery 105 or the electric vehicle battery 122.

On the other hand, if at step S103 the controller 110 determines that the electric vehicle battery 122 is not connected (or that the electric vehicle battery 122 is fully charged), the system 100 proceeds to step S110. At S110 the controller 110 determines whether the $HVDC_p$ is sufficient to provide a charge to the storage battery 105. If the $HVDC_p$ is sufficient, the system 100 proceeds to step S111 where the controller 110 causes the system 100 to operate at the first mode. If the $HVDC_p$ is insufficient to provide a charge to the storage battery 105, the system proceeds to step S112 where the controller 110 determines if the SoC of the storage battery 105 is greater than a predetermined threshold. Again, this threshold may be the same threshold or a different threshold than $T_h$. For purposes of illustration, $T_h$ will be used to describe a common threshold between the SoC of the storage battery 105 at step S106 and step S112. If the SoC of the storage battery 105 is above the $T_h$, the system 100 proceeds to step S113, where the controller 110 causes the system 100 to operate at the second mode. If the SoC of the storage battery 105 is below the $T_h$, then the system 100 proceeds to step S114 where the DC-DC converter 115 is turned off (or idle) and no power is flowing to or from the storage battery 105 or the electric vehicle battery 122.

As will be discernible from the above description of FIG. 3, the DC-DC converter 115 will include a control algorithm, accessible by the controller 110, with at least three objectives: (i) charge the electric vehicle battery 122 through controlling the voltage and current at the electric vehicle battery 122 side or portion of the system 100 based on reference information received from the electric vehicle battery's 122 battery management system ("BMS") through power line communication ("PLC"); (ii) charge the storage battery 105 by controlling the voltage and current through the storage battery 105 side or portion of the system 100; and (iii) support the high voltage DC ("HVDC") link voltage by discharging the electric vehicle battery 122 or the storage battery 105. The system 100 will consider charging the electric vehicle battery 122 to be the highest priority objective to ensure that users of the chargers are able to use their electric vehicles. Hence, step S103 determines whether an electric vehicle battery 122 is connected before any mode is selected for implementation.

The system 100, as evident from the above description and figures, consists of both hardware circuits and software algorithm components. The algorithms primarily control regulation of voltage, current, direction of power flow, and enablement of suitable operating modes. Any suitable control technique may be used to regulate the voltages and currents in the circuits, such as but not limited to sliding mode control ("SMC"), model predictive control ("MPC"), disturbance rejection-based control ("DRC"), and self-tuning control ("STC"). The system 100 with its different control settings and modes works to convert fast EV charging stations from a grid-stressor to a grid-reliever by providing various ancillary services such as virtual inertia, distributed storage, frequency support, grid voltage support, and supporting load demand management programs. Examples of this include: (i) supporting two batteries using a single converter; (ii) enhanced charging reliability and availability through introducing a leg-level redundancy to support fault tolerant control, and ensure that the charge will work efficiently during post-fault; (iii) providing ancillary services for the power grid even if there is no EV connected to the charger; and (iv) supporting portable charging in case the main power grid is unavailable, weak, or experiencing a peak demand period. Furthermore, the system 100 accomplishes these benefits without an increased number of power electronic switches or fragile passive components (such as capacitors) to provide a wide range of services and functions. The system 100 is able to support power flow between different sources (for example, between connected batteries), does not require multiple additional converters to support energy storage systems, and is multi-directional.

Figures 4A, 4B:
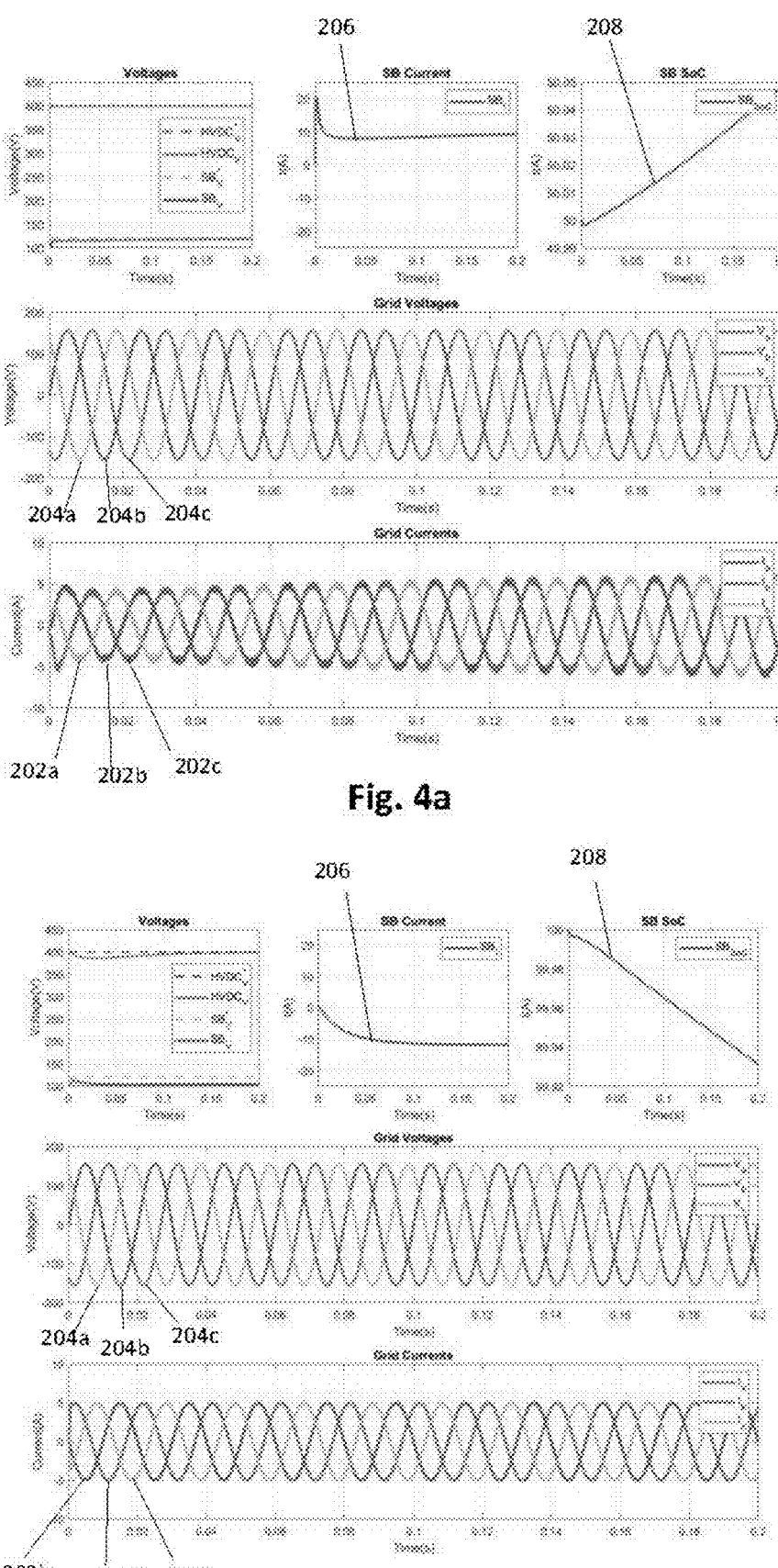
FIGS. 4a-b illustrate simulated validation data of charging and discharging of a storage battery of the system according to the present disclosure.

FIGS. 4a and 4b provide validation data rendered using simulation software for the response of the disclosed DC-DC converter 110 during charging and discharging of the storage battery 105. As can be seen in FIG. 4a, the grid current (comprising three phases 202a-c of AC) is positive (in phase with the grid voltage comprising three phases 204a-c of AC voltage), indicating that the charging station is operating in grid-to-storage mode ("G2S"). Similarly, the storage battery current (206) is positive, which indicates the DC side current is delivered to the storage battery. Therefore, the storage battery is charging and its SoC (208) is increasing. When the operation of the system 100 is changed to storage-to-grid mode ("S2G"), as is the case in FIG. 4b, power is being demanded from the storage battery by the grid. In this situation, the grid current (phases 202a-c of AC) is out of phase with the grid voltage (phases 204a-c). The storage battery feeds the HVDC bus, which in turn converts the DC current to AC and feeds the grid. Storage battery current 206 becomes negative and the SoC 208 of the storage battery begins to decrease as a result.

Without further elaboration, it is believed that one skilled in the art can use the preceding description to utilize the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

The invention is claimed as follows:

1. A system comprising:
an AC-DC converter;
a storage battery;
a controller, communicatively coupled to the storage battery; and
a DC-DC converter module coupled to the controller, the DC-DC converter including a high voltage interface, an electric vehicle interface, and a storage battery interface,
wherein the high voltage interface electrically couples the converter module to a high voltage power source, the storage battery interface electrically couples the converter module to the storage battery, and the electric vehicle interface electrically couples the converter module to an electric vehicle battery, and
wherein the DC-DC converter is configured to transmit power to and from the high voltage source, the storage battery, an electric vehicle battery in response, at least in part, to a signal from the controller.

2. The system of claim 1, wherein, in a first operating mode, the DC-DC converter module is electrically disconnected from the electric vehicle battery and the DC-DC converter module transmits power from the high voltage power source to the storage battery.

3. The system of claim 2, wherein the controller causes the first operating mode to be activated when the electric vehicle battery is disconnected from the electric vehicle interface, a state of charge of the storage battery is less than a predetermined threshold state of charge, and the high voltage power source has a sufficient energy supply to charge the storage battery.

4. The system of claim 1, wherein, in a second operating mode, the DC-DC converter module is electrically disconnected from the electric vehicle battery and the DC-DC converter module transmits power from the storage battery to the high voltage power source.

5. The system of claim 4, wherein the high voltage power source comprises an electrical grid, and the electrical grid repurposes the power from the storage battery.

6. The system of claim 4, wherein the controller causes the second operating mode to be activated when the electric vehicle battery is disconnected from the electric vehicle interface, a state of charge of the storage battery is above a predetermined threshold state of charge, and an energy demand on the high voltage power source exceeds an energy supply of the high voltage power source.

7. The system of claim 1, wherein, in a third operating mode, the DC-DC converter module is electrically disconnected from the storage battery based at least in part on a signal from the controller and the DC-DC converter module transmits power from the high voltage power source to the electric vehicle battery.

8. The system of claim 7, wherein the controller causes the third operating mode to be activated when a state of charge the electric vehicle battery is below a predetermined level of charge and the high voltage power source has a sufficient supply to charge the electric vehicle battery.

9. The system of claim 1, wherein, in a fourth operating mode, the DC-DC converter module is electrically disconnected from the storage battery based at least in part on a signal from the controller and the DC-DC converter module transmits power from the electric vehicle battery to the high voltage power source.

10. The system of claim 9, wherein the high voltage power source comprises an electrical grid, and the electrical grid repurposes the power from the electric vehicle battery.

11. The system of claim 9, wherein the controller causes the fourth operating mode to be activated when a state of charge of the electric vehicle battery is above a predetermined level of charge and an energy demand on the high voltage power source exceeds an energy supply of the high voltage power source.

12. The system of claim 1, wherein, in a fifth operating mode, the DC-DC converter module is electrically disconnected from the high voltage power source and the DC-DC converter module transmits power from the storage battery to the electric vehicle battery.

13. The system of claim 12, wherein the controller causes the fifth operating mode to be activated when a state of charge of the electric vehicle battery is below a predetermined level of charge and an energy supply through the high voltage interface is insufficient to charge the electric vehicle battery.

14. The system of claim 12, wherein the DC-DC converter module is electrically disconnected from the high voltage power supply based at least in part on a signal from the controller.

15. The system of claim 12, wherein the DC-DC converter module is electrically disconnected from the high voltage power supply by physical disconnection of the high voltage power supply.

16. The system of claim 1, wherein the controller performs periodic checks on a state of the electric vehicle battery, the storage battery, and the high voltage power source.

17. The system of claim 1, wherein the controller causes one of a plurality of operating modes to be activated based at least in part on a state of the electric vehicle battery, the storage battery, and the high voltage power source.

18. A method of managing power transmission in an electric vehicle charger, the method comprising:

providing a DC-DC converter module coupled to a controller, the DC-DC converter including a high voltage interface, an electric vehicle interface, and a storage battery interface;

measuring a state of charge of an electric vehicle battery electrically coupled to the electric vehicle interface;

measuring a state of charge of a storage battery electrically coupled to the storage battery interface;

measuring a power level of a high voltage DC bus electrically coupled to the high voltage interface; and determining whether the electric vehicle battery is electrically coupled to the electric vehicle interface.

19. The method of claim 18, wherein when it is determined that the electric vehicle battery is electrically coupled to the electric vehicle interface, the method further comprises: while the power level of the high voltage DC bus is determined to be sufficient to charge the electric vehicle battery, charging the electric vehicle battery by power from the high voltage DC bus; and while the power level of the high voltage DC bus is determined to be insufficient to charge the electric vehicle battery: when the state of charge of the storage battery is above a first predetermined threshold state of charge, charging the electric vehicle battery by power from the storage battery.

20. The method of claim 18, wherein when it is determined that the electric vehicle battery is not electrically coupled to the electric vehicle interface, the method further comprises: while the power level of the high voltage DC bus is determined to be sufficient to charge the storage battery, charging the storage battery by power from the high voltage DC bus; and while the power level of the high voltage DC bus is determined to be insufficient to charge the storage battery: when the state of charge of the storage battery is determined to be above a second predetermined threshold state of charge, transmitting power from the storage battery to the high voltage DC bus.

* * * * *